US009465745B2

(12) United States Patent
Rege (10) Patent No.: US 9,465,745 B2
(45) Date of Patent: Oct. 11, 2016

(54) MANAGING ACCESS COMMANDS BY MULTIPLE LEVEL CACHING (75) Inventor: Satish Laxmanrao Rege, Colorado Springs, CO (US)

(73) Assignee: Seagate Technology, LLC, Cupertino, CA (US)

(*) Notice: Subject to any disclaimer, the term of this patent is extended or adjusted under 35 U.S.C. 154(b) by 636 days.

(21) Appl. No.: 12/757,279

(22) Filed: Apr. 9, 2010
(Under 37 CFR 1.47)

(65) Prior Publication Data

US 2011/0252205 A1  Oct. 13, 2011

(51) Int. Cl.
*G06F 12/00* (2006.01)
*G06F 13/00* (2006.01)
*G06F 13/28* (2006.01)
*G06F 12/08* (2016.01)

(52) U.S. Cl.
CPC ..... *G06F 12/0868* (2013.01); *G06F 2212/314* (2013.01)

(58) Field of Classification Search
CPC .............. G06F 12/0868; G06F 2212/314
USPC ................................. 711/154, 169
See application file for complete search history.

(56) References Cited

U.S. PATENT DOCUMENTS

| 5,603,063 | A  | * | 2/1997  | Au ........................ 710/52 |
| 5,778,418 | A  |   | 7/1998  | Auclair et al. |
| 5,860,083 | A  |   | 1/1999  | Sukegawa |
| 6,170,042 | B1 | * | 1/2001  | Gaertner et al. ........... 711/158 |
| 6,397,296 | B1 |   | 5/2002  | Werner |
| 6,598,119 | B2 |   | 7/2003  | Becker et al. |
| 6,826,630 | B2 |   | 11/2004 | Olds et al. |
| 6,970,976 | B1 |   | 11/2005 | Arimilli et al. |
| 6,981,070 | B1 |   | 12/2005 | Luk et al. |
| 6,993,628 | B2 |   | 1/2006  | Starke |
| 7,055,002 | B2 |   | 5/2006  | Cargnoni et al. |
| 7,058,766 | B2 |   | 6/2006  | Modha |
| 7,099,993 | B2 |   | 8/2006  | Keeler |
| 7,136,966 | B2 |   | 11/2006 | Hetrick |
| 7,136,967 | B2 |   | 11/2006 | Sawdey |
| 7,136,973 | B2 |   | 11/2006 | Sinclair |
| 7,143,393 | B1 |   | 11/2006 | Ezra et al. |
| 7,167,944 | B1 |   | 1/2007  | Estakhri |
| 7,302,534 | B2 |   | 11/2007 | Sinclair |
| 7,461,202 | B2 |   | 12/2008 | Forrer, Jr. et al. |
| 7,475,194 | B2 |   | 1/2009  | Accapadi et al. |
| 2006/0179231 | A1 | | 8/2006  | Briggs et al. |

(Continued)

*Primary Examiner* — Sheng-Jen Tsai
(74) *Attorney, Agent, or Firm* — Hall Estill Attorneys at Law (57) ABSTRACT Apparatus and associated method concerning managing access commands with a main storage space, a volatile buffer, and a nonvolatile buffer. The volatile buffer is configured to store a plurality of command nodes that are associated with data access commands received from a remote device and directed to the main storage space. The apparatus also has command prioritizing logic configured for using a prescribed rule in repeatedly identifying two or more candidate command nodes of the plurality that are at least individually favored for execution with respect to the main storage space, for selecting one of the candidate command nodes for the execution, and for transferring a nonselected one of the candidate command nodes from the volatile buffer to the nonvolatile buffer where the nonselected command node continues to be considered for execution with respect to the main storage space but is no longer considered by the prescribed rule when identifying subsequent candidate command nodes in the volatile buffer.

10 Claims, 6 Drawing Sheets

(56) References Cited

U.S. PATENT DOCUMENTS

2007/0094450 A1 4/2007 VanderWiel
2007/0214340 A1* 9/2007 Leveille et al. .............. 711/203
2010/0077175 A1* 3/2010 Wu et al. ...................... 711/172
2010/0169708 A1* 7/2010 Rudelic et al. ................. 714/15
2010/0312955 A1* 12/2010 Hwang et al. ................ 711/105

* cited by examiner

MANAGING ACCESS COMMANDS BY MULTIPLE LEVEL CACHING

SUMMARY OF THE INVENTION

In some embodiments an apparatus is provided that has a main storage space, a volatile buffer, and a nonvolatile buffer. The volatile buffer is configured to store a plurality of command nodes that are associated with data access commands received from a remote device and directed to the main storage space. The apparatus also has command prioritizing logic configured for using a prescribed rule in repeatedly identifying two or more candidate command nodes of the plurality that are at least individually favored for execution with respect to the main storage space, for selecting one of the candidate command nodes for the execution, and for transferring a nonselected one of the candidate command nodes from the volatile buffer to the nonvolatile buffer where the nonselected command node continues to be considered for execution with respect to the main storage space but is no longer considered by the prescribed rule when identifying subsequent candidate command nodes in the volatile buffer.

In some embodiments a computer readable medium is provided having instructions stored thereon that when processed by a computer define candidate command nodes from a plurality of command nodes residing in a volatile buffer that are associated with respective data access commands to transfer data with respect to a main storage space. The instructions when processed furthermore schedule a selected one of the candidate command nodes for execution with respect to the main storage space, and transfer a nonselected one of the candidate command nodes from the volatile buffer to a nonvolatile buffer. The instructions when processed then execute the transferred nonselected candidate command node with respect to the main storage space without first transferring it back to the volatile buffer.

In some embodiments a method is provided that includes storing a plurality of command nodes in a volatile buffer associated with data access commands received from a remote device; defining candidate command nodes of the plurality of command nodes; executing a selected one of the candidate command nodes with respect to the main storage space; transferring a nonselected one of the candidate command nodes from the volatile buffer to a nonvolatile buffer; and executing the transferred nonselected candidate command node with respect to the main storage space without first transferring it back to the volatile buffer.

DETAILED DESCRIPTION

The present embodiments generally contemplate an apparatus and associated method for controlling a throughput of data between a remote device and a local storage space in a processing system that performs data storage activities.

Data storage devices routinely receive and process great numbers of access commands to read or write data from or to a storage space. When access commands are received faster than they can be executed, the access commands and any accompanying data are typically buffered to await their turn for execution. Efforts to optimize data throughput performance mean that the access commands are usually executed in a different order than that in which they were originally received.

This reordering of the access commands is performed with the goal of improving the utilization of the processor controlling the transfer of data to and from the storage space. Generally, it is often more efficient to execute one access command over another. For instance, the ordering of the access commands can be correlated to wear leveling rules in a solid state memory to minimize disruptions in the ready state that permits data to be transferred. In disc drives, for instance, the ordering of the access commands can be correlated to the current head position to minimize the seek and latency delays between consecutive commands.

It is possible for a particular access command to remain in the buffer for an inordinately long time because of this continuous reordering of the access commands. The duration each access command has resided in the buffer can be tracked for that reason, and an access command that has resided in the buffer longer than expected can be flagged as an aged command. Aged commands are then generally given priority over nonaged commands to enforce a fairness in the buffer across all access commands. For example, aged commands are usually executed first when the buffer is approaching a saturated state, meaning a heightened rate at which commands are executed is invoked to make room for newer incoming access commands.

Figure 1:
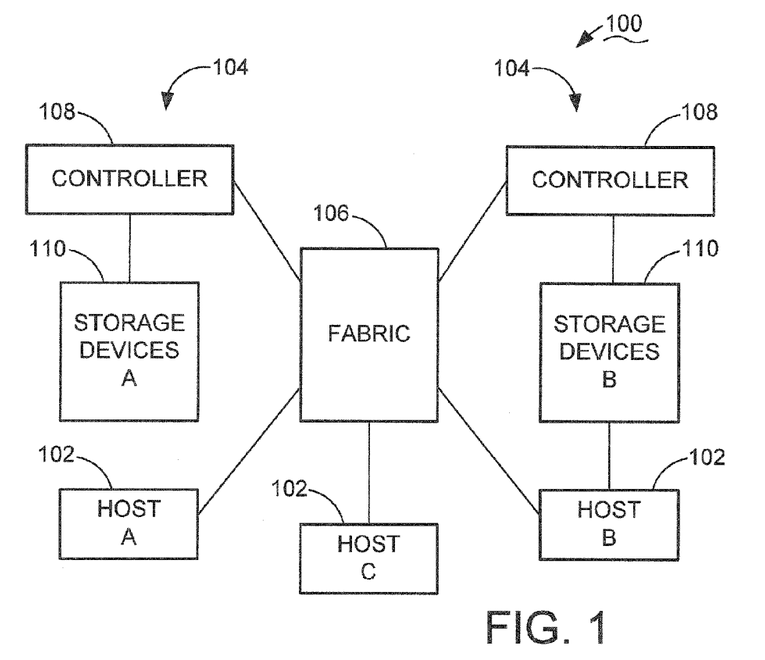
FIG. 1 depicts a distributed storage system that is constructed in accordance with embodiments of the present invention.

To illustrate an exemplary environment in which presently preferred embodiments of the present invention can be advantageously practiced, FIG. 1 depicts a computer-based system 100 characterized as a wide area network (WAN) utilizing mass storage. The system 100 includes a number of host computers 102, sometimes referred to herein as remote devices, and respectively identified as host computers A, B, and C. The host computers 102 interact with each other as well as with a pair of data storage arrays 104 (denoted A and B, respectively) via a fabric 106. The fabric 106 is preferably characterized as fibre-channel based switching network, although other configurations can be utilized as well, including the Internet.

Each array 104 is depicted as including a controller 108 and a set of data storage devices 110. Although the controller 108 is included within the array 104 for purposes of this description, the contemplated embodiments are not so limited because in alternative equivalent embodiments the controller 108 can reside in part or in whole within the storage devices 110, the fabric 106, and the host computer 102. The data storage devices are preferably arranged and operated in a manner so as to form a redundant array of independent drives (RAID) to provide a desired level of fault tolerance in the event of a loss of or error in stored data.

It is further contemplated that the A host computer 102 and the A data storage array 104 can be physically located at a first site, the B host computer 102 and B storage array 104 can be physically located at a second site remote from the first site, and the C host computer 102 can be yet at a third site remote from the first and second sites, although such is merely illustrative and not limiting.

Figure 2:
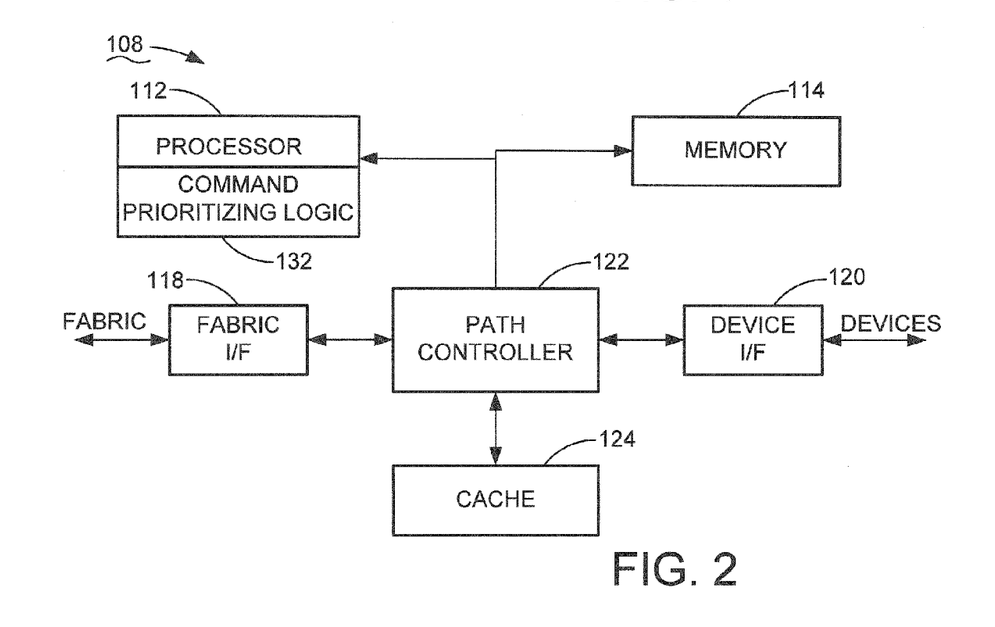
FIG. 2 depicts a functional block diagram of the controller in FIG. 1.

FIG. 2 illustrates one of the controllers 108 in greater detail. The controller 108 can be embodied in a single integrated circuit, or distributed among a number of discrete circuits as desired. A main processor 112, preferably characterized as a programmable, computer processor, provides control in accordance with programming steps and processing data preferably stored in memory 114. A fabric interface (I/F) 118 communicates with the other controllers 108 and the host computers 102 via the fabric 106, and a device I/F 120 communicates with the storage devices 110, sometimes referred to herein as the main storage space. The I/Fs 118, 120 and a path controller 122 form a communication path to pass commands and data between the respective storage array 104 and the host computers 102, such as by employing the cache 124 in accordance with the embodiments described herein. Although illustrated discretely, it will be understood that the path controller 122 and the I/Fs 118, 120 can be unitarily constructed.

The data storage capacity of an array 104, defined by the extent of the data storage devices 110 in a given array 104, is organized into logical units (LUNs) that can be written to and read from the array 104. System configuration information defines the relationship between user data, including any associated parity and mirror data, with the respective storage locations. The system configuration information furthermore identifies the relationship between blocks of storage capacity allocated to user data and the memory storage locations, such as logical block addresses (LBA). The system configuration information can furthermore include virtualization by defining virtual block addresses that are mapped to LBAs. System configuration information is changed in response to a configuration change request from the system 100. In response, storage capacity can be allocated, such as when saving new files or enlarging existing files, or storage capacity can be deallocated, such as when deleting files or reducing the size of existing files.

Figure 3:
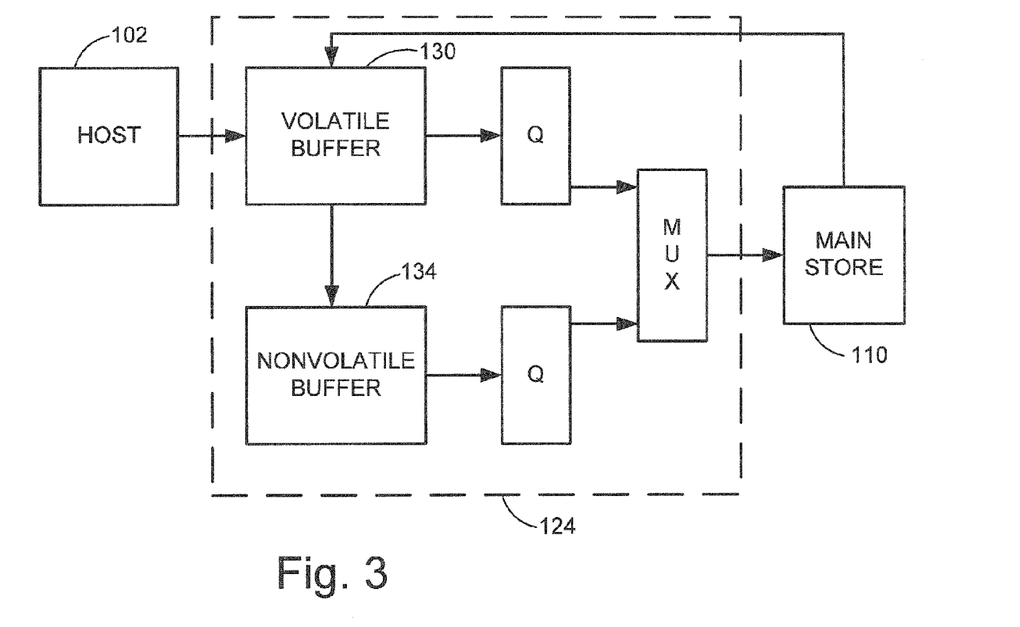
FIG. 3 depicts a functional block diagram of the cache in FIG. 2.

FIG. 3 is a functional block depiction of a cache 124 constructed in accordance with embodiments of the present invention. The cache 124 has a volatile buffer 130 such as a DRAM and the like that advantageously matches pace with the host bus speed to receive data access commands from the host computers 102 directed at storing data to ("write commands") and retrieving data from ("read commands") the data storage devices 110.

A write command typically includes data to be written to the storage devices 110 along with a logical address indicating where the data is to be written and the number of bytes to write. A read command typically includes a logical address indicating the location or locations of data to be read, and a size indicator indicating the number of bytes to be read.

The data access commands are for the most part stored momentarily in the volatile buffer 130 because the rate with which they can be executed to the data storage devices 110 is not as fast as the rate with which they can be received via the host bus. While being retained there, the data access commands are prioritized in such a way that optimizes the throughput of data between the host computers 102 and the data storage devices 110. In some embodiments, for example, the data access commands residing in the buffer 130 can be prioritized according to the interval required to execute them individually, irrespective of what command type it is. In other embodiments, as described below, it is advantageous to prioritize the data access commands based on the type of commands, such as by executing pending data access commands as a higher priority than nonpending data access commands.

In any event, in some circumstances a data access command will wind up residing in the volatile buffer 130 longer than a predefined limit that is set to ensure a fairness across all data access commands. A data access command in that circumstance is identified as being an "aged" data access command, and the present embodiments are directed at novel ways of handling them. Typically, an aged data access command will be executed at the highest priority, especially when the volatile buffer 130 is saturated or is nearly saturated whereby the aged access commands must be executed with dispatch to make room for receiving more recent data access commands from the host 102. The embodiments of the present invention recognize a preferred solution is one that in some circumstances transfers aged access commands out of the volatile buffer without executing them and retains them momentarily elsewhere.

As used herein, "pending" commands refer to those that are viewed by the host computer 102 as not yet executed with respect to the data storage devices 110. A read command, for example, is a pending command. During a typical read operation, the host computer 102 sends the data access command requesting the data storage devices to send stored data to the host computer 102. The host computer 102 then waits for the data storage devices 110 to send the requested data. As such, the data access command remains to be a pending command until the host computer 102 actually receives the requested data from the data storage devices 110.

Contrarily, for example, a write command in a system employing a writeback mode is a nonpending command. In the writeback mode, the host computer 102 sends the data access command with accompanying data to be stored to the data storage devices 110. As discussed, the buffer 130 stores both the access command and the associated data. The buffer 130 will acknowledge to the host 102 that the data is received once it is cached, even before the data is stored in its intended destination in the data storage devices 110. This writeback mode permits the system to transfer the data from the buffer 130 to the data storage devices 110 at an optimal time, perhaps at a subsequent time in acting subserviently to the processing of higher priority pending commands in the interim.

Thus, this is an illustration of how it is often desirable to execute the data access commands with respect to the data storage devices 110 in a sequence that is different than that in which they were received from the host computers 102. As is described below, embodiments of the present invention include novel methods and systems of prioritizing commands depending on where the command is directed, such as the storage address, and depending on the type of command, such as whether it is a pending command and an aged command and the like.

To that end, in some embodiments the processor 112 executes computer instructions stored in the memory 114 or in other hardware to carry out the processing steps described herein. In other embodiments, such computer executable instructions can be processed by other components alone or in combination with other components such as but not limited to the I/Fs 118, 120, the path controller 122, and the cache 124. Other embodiments not explicitly mentioned herein will be readily apparent to the skilled artisan to implement the features of the present embodiments. As will be understood, the various embodiments of the methods described herein may be implemented in any combination of hardware, software, or firmware.

Figure 4A:
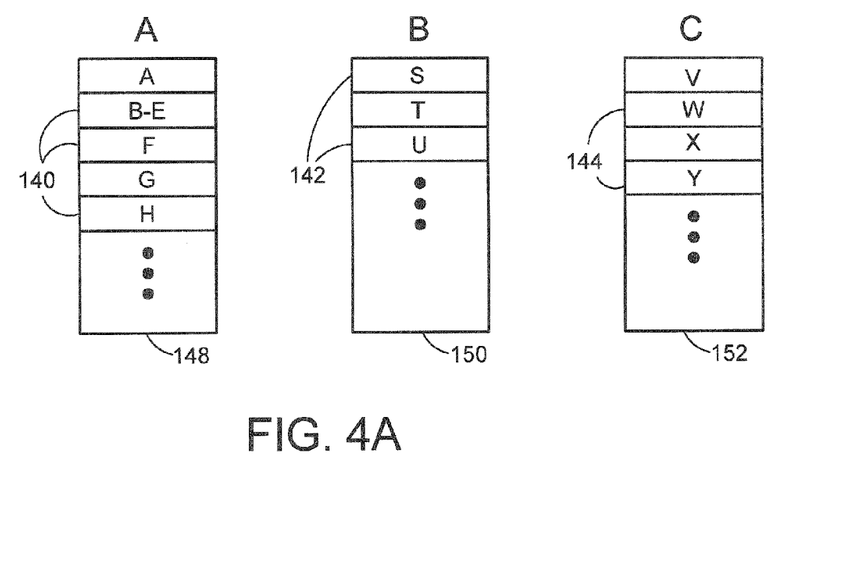
FIGS. 4A and 4B depict command queues that are used in the volatile memory in FIG. 3 to manage a plurality of command nodes.

FIG. 4A illustrates a manner in which data access commands from the host computer 102 are managed in the volatile memory 130 in terms of command nodes 140, 142, 144 that are constructed to correspond to respective data access commands, and in terms of command queues 148 ("A Queue"), 150 ("B Queue"), 152 ("C Queue") that are constructed to facilitate manipulating the command nodes.

Command nodes typically include a number of fields containing data relevant to specific commands and specific systems. For example, a command node can generally include data fields that specify the buffer address of the information to be transferred, the transfer length of the information to be transferred, and the start of the logical block address (LBA) issued or requested by the host computer 102.

System specific data fields, such as for a disc drive data storage device, can include the start of the physical cylinder where data is to be transferred, the start of the physical head, the start of the physical sector/starting wedge where data is to be transferred, the end of the physical cylinder where data is to be transferred, the end of the physical head, the end of the physical sector/starting wedge where data is to be transferred, and the end of the physical cylinder where data is to be transferred. Additionally, each command node preferably includes data fields for a previous link pointer and for a next link pointer. In some embodiments the logical order of the command nodes is defined by the previous link and next link pointers, such as in a command queue constructed of a doubly linked list of command nodes.

A command node will also typically include a data field for specifying what type of command (read, write, etc.) is to be executed in relationship to the command node. For example, the command node may include a field for control flags that specify the command associated with the command node. The structure of the command node, that is, the number of fields and the types of data that are required in the fields, is dependent on the types of commands executed by the system and by the type of system, such as whether it communicates as a SCSI device or an AT device and the like.

The skilled artisan will appreciate that the command node structure described herein is illustrative and not limiting of all configurations and contents of a command node contemplated by the present embodiments. Any number of different command node configurations and contents may be used in accordance with the various embodiments described herein.

All of the data access commands received by the volatile memory 130 from the host computers 102 can be initially assembled into respective command nodes by the controller 108 and assigned to the A command queue 148, which functions as a "catch all" command queue. FIG. 4A depicts command nodes A, B-E, F, and G being among the command nodes presently residing in the A command queue 148. The command node B-E is associated with an access command for sequential data at storage locations B, C, D, and E.

Those command nodes are then periodically transferred to the B command queue 150 where the controller 108 executes a command prioritizing logic (CPL) module 132 (FIG. 2) that defines a priority for executing them. In the depicted embodiments the CPL module 132 resides in processor 112 memory, although the present embodiments are not so limited. Alternatively, in other embodiments computer executable instructions defining the CPL 132 can be processed by other components alone or in combination with other components such as but not limited to the I/Fs 118, 120, the path controller 122, and the cache 124. Other embodiments not explicitly mentioned herein will be readily apparent to the skilled artisan to implement the various features of the present embodiments. As will be understood, the various embodiments of the methods described herein may be implemented in any combination of hardware, software, or firmware.

Figure 5:
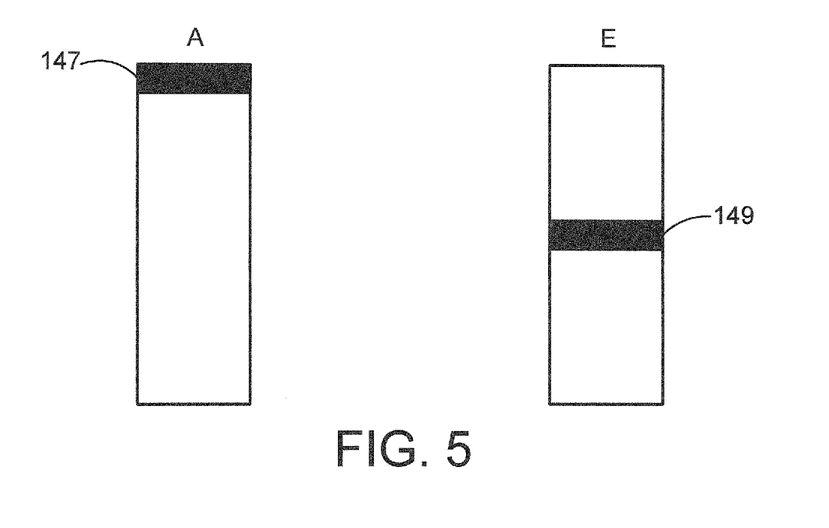
FIG. 5 depicts a zone based prescribed rule for selecting candidate command nodes.

Generally, the CPL module 132 defines priority for the contents of the B command queue 150 for the purpose of optimizing a throughput of data between the host 102 and the data storage devices 110. There are a number of algorithms that can be employed for supplying the prescribed rule. For example, a rotational position sorting (RPS) algorithm is used in disc drive data storage devices. The RPS routine basically determines which of the command nodes in the A command queue 148 can be executed within a predefined interval, given the current head location at the time. Both the seek time and the rotational latency time are preferably considered in prioritizing command nodes based on the RPS algorithm. Alternatively, the "elevator" algorithm, commonly referred to as the SCAN algorithm, or its close variant the CSCAN algorithm provide prescribed rules that key on prioritizing command nodes on the basis that they lie within a moving zone of the storage space. Other illustrative embodiments can use variations of zone-based prescribed rules, such as those that are disclosed by copending U.S. patent application Ser. Nos. 11/477,980 and 11/479, 106, both of which are assigned to the assignee of the present application. FIG. 5, for example, is from the copending U.S. patent application Ser. No. 11/477,980 depicting a primary storage domain A and mirrored domain E. In those embodiments the prescribed rule prioritizes the command nodes in the B command queue according to those that are associated with predefined zones 147, 149 in the respective domains A, E. The zones 147, 149 continuously sweep across the domains A, E while retaining a constant offset therebetween.

Figure 4B:
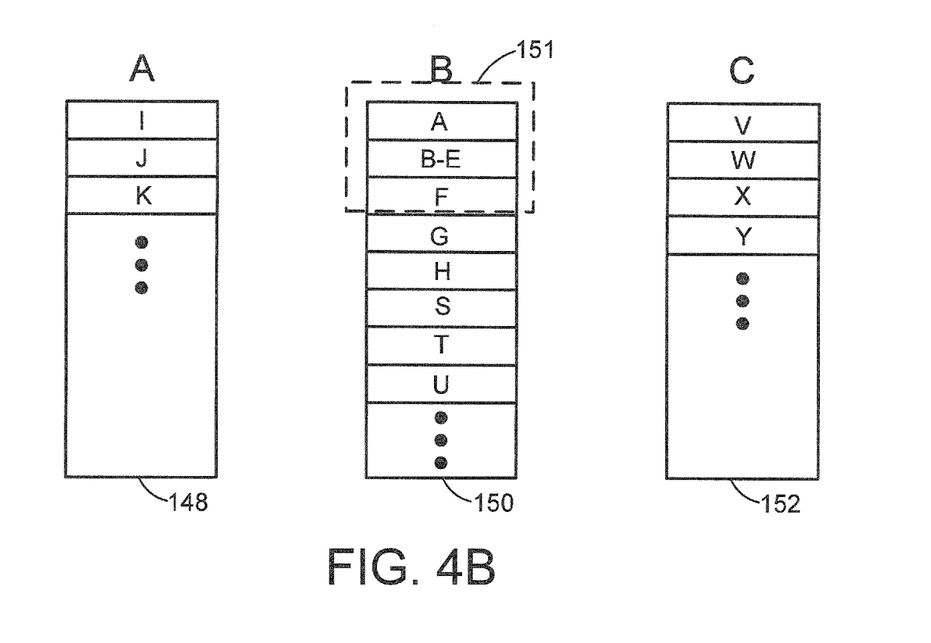

FIG. 4B depicts the command nodes A, B-E, F, G, and H having been transferred from the A command queue 148 to the B command queue 150 based on the RPS priority rule and the current head position. That is, with reference to the current head location, command node A requires the shortest interval (shortest combined seek time and latency time) required to execute it. The sequential command node B-E is next in priority, followed by the command node G and so on as depicted.

As a byproduct of prioritization, the RPS rule identifies all of the prioritized command nodes in the B command queue 150 that can be individually executed within a predefined interval. The command nodes are referred to herein as the "candidate command nodes." For purposes of this illustration the window 151 depicts the instantaneous results of that determination, that any of the A, B-E, or F command nodes can be individually executed within the predefined interval. In this manner it will be understood that the CPL module 132 functions to use the prescribed rule of priority to continually identify two or more candidate command nodes of the plurality residing in the volatile memory 130 that are at least individually favored for execution with respect to the main storage space.

After the candidate command nodes are identified, the CPL module 132 then selects one or more of them for execution with respect to the data storage devices 110. The command nodes are referred to herein as "selected command nodes." The selected command nodes are transferred to the C command queue 152. In other words for purposes of this description, when a command node is transferred from the B command queue 150 to the C command queue 152 it means that command node has been selected for execution with respect to the main storage space (data storage devices 110) from the volatile buffer 130.

Figure 6:
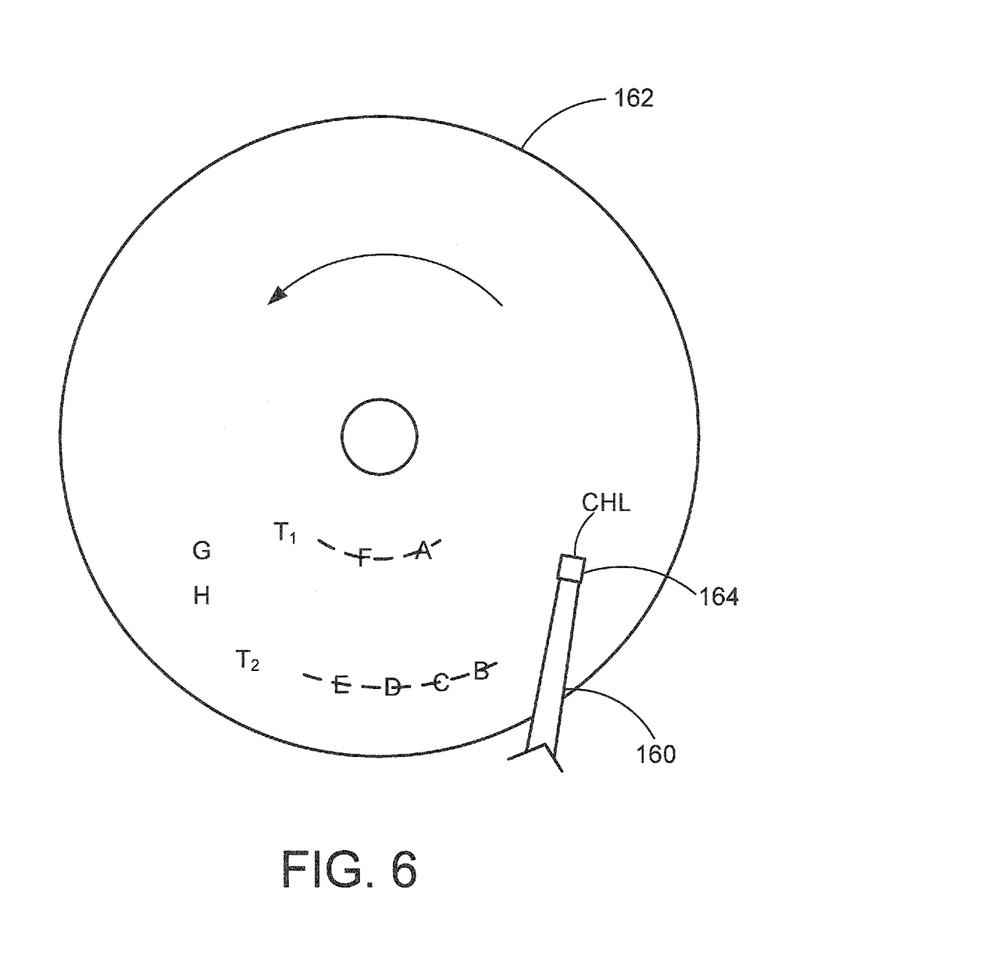
FIG. 6 depicts the respective main storage addresses associated with a plurality of command nodes in the volatile memory in a disc drive data storage device.

Turning now to FIG. 6, which is used in conjunction with the illustrative examples of FIGS. 4A, 4B to illustrate circumstances where the CPL module 132 would schedule one or more of the selected command nodes for execution by transferring them to the C command queue 152. For purposes of this illustration, a disc drive data storage device is referred to although the present embodiments are not so limited. The contemplated embodiments encompass other types of data storage devices as well, including solid state storage devices, where meaningful priorities are applicable to the order with which the cached command nodes are executed.

FIG. 6 diagrammatically depicts an actuator 160 operably disposed in a data transfer relationship with a storage disc 162 that is rotating counterclockwise. The actuator 160 supports a data transfer member ("head") 164 at a distal end thereof. A current head location is denoted as "CHL," which is relevant feedback to the CPL module 132 as it prioritizes the command nodes in the B command queue 150 and identifies the one or more candidate command nodes 151. For purposes of this illustration, consistent with the depiction of the candidate command node window 151 in FIG. 4B, the CPL module 132 then selects one or more selected command nodes from the candidate command nodes A, B-E, and F for execution.

Further for purposes of this illustration, non-sequential addressable locations A and F are both on track T1, and sequential addressable locations B-E are on track 12. Command node A has been flagged as an aged command, meaning it has resided in the volatile memory 130 longer than a predefined interval that is set to ensure fairness in moving all of the command nodes through the cache in a reasonably average pace. An aged command node is typically bestowed with a priority status that results in it being selected in preference to any other non-aged candidate command nodes. Without cache fairness it is conceivable that a command node could remain stuck in the cache indefinitely.

However, for purposes of this illustration the CPL module 132 has determined that it cannot execute both the aged command node A and the entire sequential command node B-E during this disc revolution because they are radially aligned in the same or nearly the same sector. That is, the latency interval is expired with respect to seeking to track T2 in order to execute command node B by the time the head has finished executing command node A on track T1. Disadvantageously, the priority bestowed to command node A for being an aged command node would result in missing the opportunity to execute the sequential command node B-E during this revolution. Even if both command nodes A and F are selected for execution during this revolution, that would still result in executing only half as much cached data activity in comparison to executing the command node B-E. Hence, a conflict exists between the priority bestowed to the aged command node A and the priority bestowed to executing the most data possible to maximize the data throughput.

The present embodiments refine the conflict by transferring a nonselected one of the candidate command nodes from the volatile buffer 130 to the nonvolatile buffer 134 instead of selecting it for execution with respect to the main storage space from the volatile buffer 130. A candidate command node in the B command queue 150 that is not selected for execution is referred to herein as a "nonselected command node." The transferred nonselected command node is still considered for execution with respect to the main storage space, as explained below, but it is advantageously transferred out of the volatile buffer 130 to satisfy the need to make room for new command nodes from more recent data access commands. As such, the transferred nonselected command node is no longer considered by the CPL module 132 priority rule when identifying subsequent candidate command nodes in the volatile buffer 130.

As described further below, execution of the nonselected command nodes transferred to the nonvolatile buffer 134 can be interleaved with the execution of the selected command nodes from the volatile buffer 130 with little or no penalty, as desired. Any of the nonselected command nodes that remain unexecuted when processing by the volatile buffer 130 is completed or suspended can then be retained indefinitely and executed at an advantageous time as a background operation, such as when the data storage device is otherwise idle but not yet switched to a reduced power state.

In some embodiments the CPL module 132 refines the resolution of these conflicts by favoring the selection of pending command nodes for execution over nonpending command nodes. The execution of nonpending command nodes is at least partially hidden to the host computers 102. Again, a writeback command is acknowledged to the host computer 102 before the write data is actually written to the main storage space. The subsequent execution to the main storage space is inconsequential in gauging data throughput performance. Contrarily, the execution of pending command nodes directly affects the host computers' 102 ability to process data. For example, the processing of a read command is not useful to the host computer 102 until it is completed, when the host computer 102 actually receives the requested data from the main storage space.

Thus, a CPL logic that selects pending commands over nonpending commands directly improves the perceived data throughput performance. Such a selection approach is the subject of U.S. Pat. No. 6,826,630 which is assigned to the assignee of this application and which is incorporated by reference in its entirety herein.

Therefore, in some embodiments the CPL module 132 selects the selected command node or nodes by favoring the execution of pending commands over nonpending commands. Preferably then, the CPL module 132 only transfers nonselected command nodes that are nonpending command nodes to the nonvolatile buffer 134. For example, in the illustrative example above the results would be different with this CPL logic if the command node A is a pending command and the command node B-E is a nonpending command. In those circumstances the CPL module 132 would select the favored pending command node A for execution during that revolution. The nonselected nonpending command node B-E might be transferred to the nonvolatile buffer 134 even if it is not an aged command. That determination can be made in view of other factors such as the present load on the volatile buffer 130 and any concomitant need to clear the way for incoming command nodes.

Under different circumstances where both the aged command node A and the command node B-E are pending commands, the CPL module 132 would resolve the conflict based on additional selection parameters that balance the interests of cache fairness and data throughput. In the event of favoring either of the two, however, the other would not be transferred to the nonvolatile buffer 134 if only nonpending command nodes are transferred.

Figure 7:
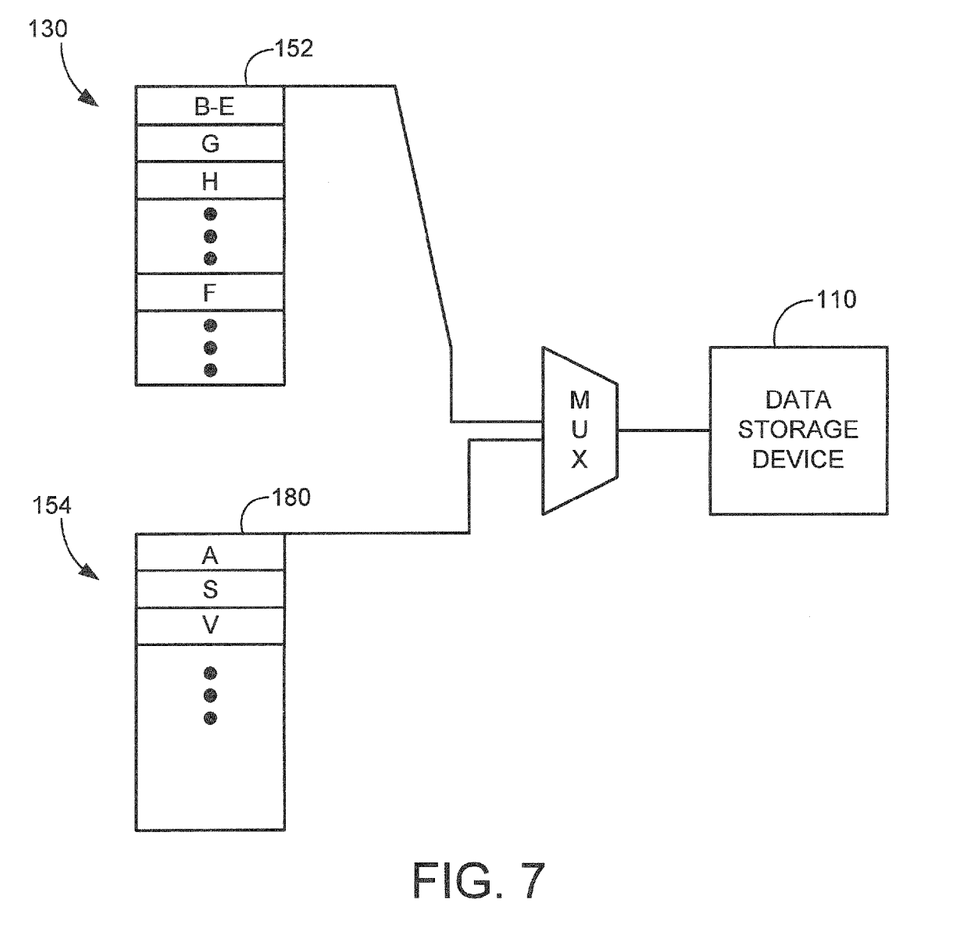
FIG. 7 depicts a functional block diagram of the cache of FIG. 3 simultaneously executing command nodes from a first command queue in the volatile memory and a second command queue in the nonvolatile memory.

Attention is now directed to a manner in which the transferred nonselected command nodes in the nonvolatile buffer 134 can be executed with respect to the main storage space in accordance with embodiments of the present invention. FIG. 7 depicts the C command queue 152 that is populated with the selected command nodes in the volatile memory 130, and another command queue 180 different than the C command queue 152 that is populated with the nonselected command nodes residing in the volatile member 134. For purposes of this illustration the command nodes B-E, G, H, and F are among the selected command nodes for execution in the order depicted in the C command queue 152. The command node A has been transferred to the command queue 180 in the nonvolatile memory 134.

The CPL module 132 is further configured for identifying one of the nonselected command nodes of the plurality in the command queue 180 to be a nonpenalizing command node for interleaving it with execution of the selected command nodes in the C command queue 152. For purposes of this description, a "nonpenalizing command node" is one that can be executed prior to executing the selected command node with a result that the nonpenalizing command node and the selected command node can both be executed within a predefined interval.

For example, the CPL module 132 can forecast the CHL at the time when execution of the selected command node B-E is completed. The CPL module 132 can also forecast the CHL at the time when execution of the next selected command node G begins. Based on these two forecasted CHLs, the CPL module 132 can calculate the interval required for executing the nonselected command node A after executing the selected command node B-E and before executing the selected command node G. If that calculated interval is less than a predefined interval, then the CPL module 132 multiplexes the execution of command nodes simultaneously from both command queues 152, 180 to interleave the nonselected command node A between the selected command nodes B-E and G.

In some embodiments the predefined interval is defined as the interval required to execute the subsequent selected command node alone. In this example, it is clear that the nonselected command node A cannot be executed after executing the selected command node B-E and prior to executing the selected command node G within an interval required to execute the selected command node G alone. That is, executing the nonselected command node A prior to executing the selected command node G would require an additional disc revolution. Thus, if no additional interval is allowed for interleaving the nonselected and selected commands then the CPL module 132 determines that the nonselected command node A is not a nonpenalizing command node with respect to the selected command node G.

However, the CPL module 132 continually tests whether each of the nonselected command nodes in the nonvolatile buffer 134 is a nonpenalizing command node with respect to all the selected command nodes in the volatile buffer 130. For instance, during the next disc revolution it is very likely that the nonselected command node A is a nonpenalizing command node with respect to the selected command node F because they are associated with nearby sectors on the same track.

Summarizing the above, the CPL module 132 includes executable instructions stored in a computer readable memory that when processed identify candidate command nodes from a plurality of command nodes residing in the volatile buffer 130 that are associated with respective data access commands to transfer data with respect to a main storage space (data storage devices 110). From the candidate command nodes, the CPL module 132 further selects one or more of them for execution with respect to the main storage space, such as by transferring the selected command node or nodes to the C command queue 152. The CPL module 132 furthermore transfers a nonselected one of the candidate command nodes from the volatile buffer 130 to the nonvolatile buffer 134, and then executes the transferred nonselected candidate command node with respect to the main storage space without first transferring it back to the volatile buffer 130.

The described structure and the functionality of the CPL module 132 advantageously provides parallel paths for processing the command nodes. The parallel processing creates opportunities to more effectively balance the conflicting goals of cache fairness and data throughput. The transfer of nonselected command nodes permanently satisfies the need when circumstances require purging the cache 124 to make room for incoming command nodes, by not returning the nonselected command nodes to the volatile memory 130 for executing them with respect to the main storage space. The transferred command nodes and the nontransferred command nodes are interleaved to the extent feasible, and then those of the transferred command nodes that are not interleaved are retained in nonvolatile memory so they can be executed as background processes when doing so does not adversely affect the throughput performance.

Figure 8:
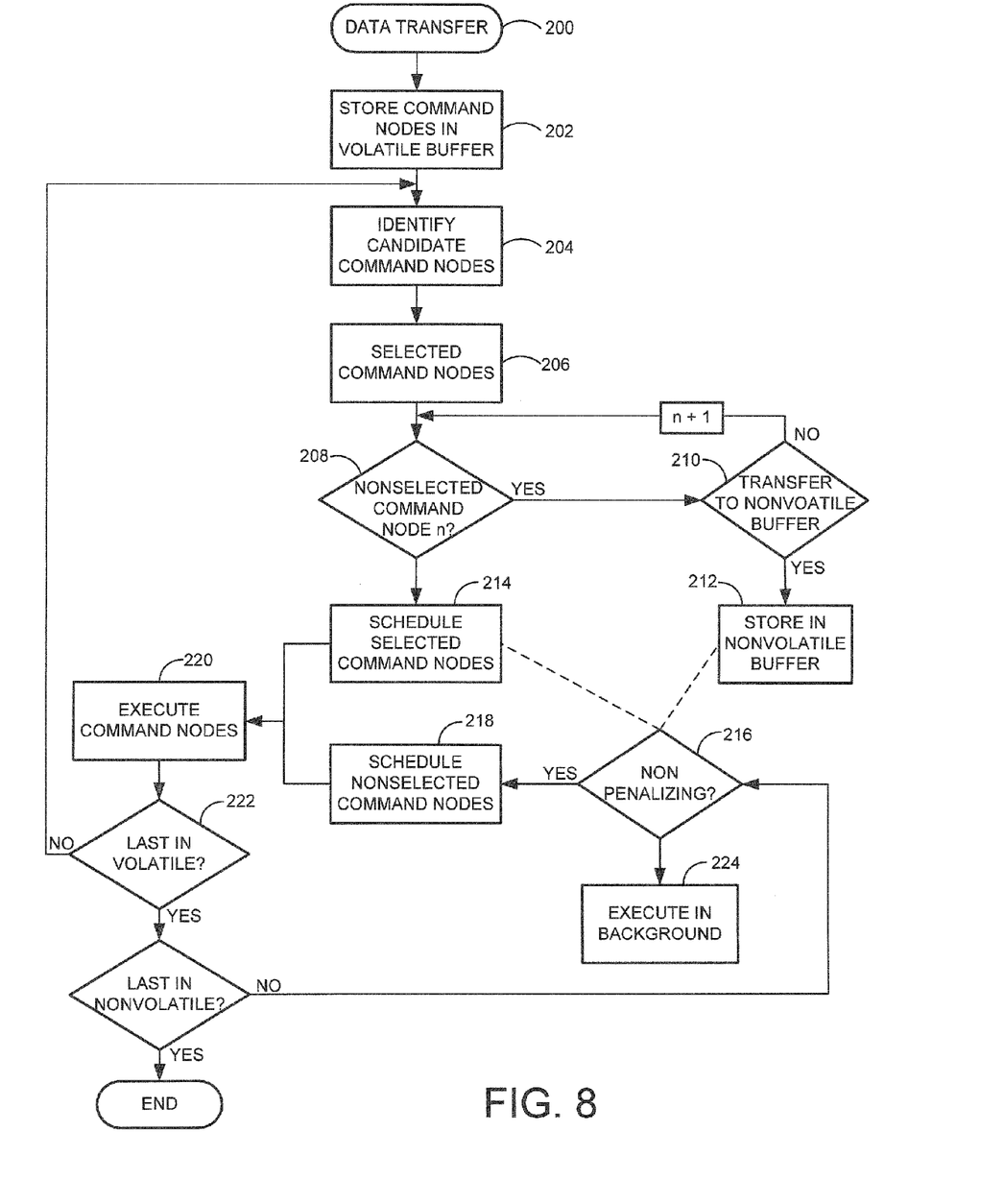
FIG. 8 is a flowchart depicting steps for performing a DATA TRANSFER method in accordance with embodiments of the present invention.

FIG. 8 is a flowchart depicting steps in a method 200 for performing DATA TRANSFER between a remote device, such as the host computers 102, and a local main storage space, such as the data storage devices 110, in accordance with embodiments of the present invention. The method 200 begins in block 202 by storing command nodes in the volatile buffer that are associated with data access commands received from the remote device. In block 204 the CPL module identifies one or more candidate command nodes from the plurality of command nodes stored in the volatile buffer. As described, for example, the identification process of block 204 can be characterized by continuously invoking a prescribed rule, such as the RPS algorithm, on the contents of the volatile buffer to control a throughput of data between the remote device and the main storage space.

In block 206 the CPL module selects one or more of the candidate command nodes for execution from the volatile buffer with respect to the main storage space. In some embodiments the plurality of command nodes residing in the volatile buffer include some that are pending command nodes and some that are nonpending command nodes. In that circumstance the selecting process of block 206 can be characterized by favoring a pending command node over a nonpending command node.

In block 208 it is determined whether any of the candidate command nodes identified in block 204 were not selected in block 206 ("nonselected command nodes"). In block 210 it is determined whether to transfer nonselected command node "n" to the nonvolatile buffer. Some embodiments transfer only nonpending command nodes to the nonvolatile buffer in this step to maximize the data throughput. If the determination of block 210 is yes, then the nonselected command node is stored in the nonvolatile buffer in block 212, and consequently deleted from the volatile buffer making room for subsequent command nodes. If, however, the determination of block 210 is no, then control returns to block 208 to consider the next nonselected command node (n+1), if it exists.

Control then passes to block 214 where the selected command nodes are scheduled for execution by transferring them to the C command queue 152. Block 216 makes the determination as to whether any of the transferred nonselected command nodes stored to the nonvolatile buffer in block 212 are nonpenalizing command nodes with respect to each of the scheduled selected command nodes stored in the volatile buffer in block 214. For example, a nonselected command node can be deemed to be a nonpenalizing command node if it can be executed prior to executing the selected command node with a result that the nonpenalizing command node and the selected command node can both be executed within an interval required for otherwise executing only the selected command node. In some circumstances two or more of the transferred nonselected command nodes can be nonpenalizing command nodes with respect to the same selected command node because both can be executed prior to executing the selected command node with a result that the nonpenalizing command nodes and the selected command node can all be executed within an interval required for otherwise executing only the selected command node.

If the determination of block 216 is yes, then the nonpenalizing nonselected command node is scheduled for execution in block 218 such as by transferring it to the command queue 180 (FIG. 7) in the nonvolatile memory. The scheduled selected command nodes in block 214 and any scheduled nonselected command nodes in block 218 are then executed in block 220, such as by multiplexing the command queues 152, 180 as disclosed in FIG. 7 and the descriptions thereof. If it is determined in block 222 that more command nodes reside in the volatile memory, then control returns to block 204.

Any of the nonselected command nodes that were determined to not be nonpenalizing command nodes in block 216 can be executed as background processes in block 224. For example, without limitation, any of those nonselected command nodes still residing in the nonvolatile buffer can be executed prior to relinquishing a ready state and entering a reduced power mode. Alternatively, any of those nonselected commands still residing in the nonvolatile buffer can be executed during a system start procedure or a return to ready state following a reduced power mode before an emphasis on executing cached command nodes.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to illustrative embodiments describing various data storage devices, it will be appreciated by those skilled in the art that the claimed subject matter is not so limited and various other systems and other devices within systems can utilize the present embodiments without departing from the spirit and scope of the claimed invention.

What is claimed:

1. An apparatus comprising:
   a main storage space;
   a volatile buffer;
   a command queue in the volatile buffer configured to store a plurality of command nodes;
   a command node window including a subset of the plurality of command nodes that are all instantaneously executable for transferring data with respect to the main storage space such that no two command nodes in the command node window can be executed at the same instant in time;
   a nonvolatile buffer; and
   a non-transitory, tangible computer readable storage medium having computer instructions defining command prioritizing logic configured to prioritize the command node window and to thereby select one of the command nodes in the command node window for execution with respect to the main storage space, and to thereby transfer a nonselected one of the command nodes in the command node window from the volatile buffer to the nonvolatile buffer, and to continually consider the nonselected command node transferred to the nonvolatile memory for a subsequent execution with respect to the main storage space but to no longer consider the nonselected command node transferred to the nonvolatile memory when subsequently prioritizing a remaining plurality of command nodes in the command queue.

2. The apparatus of claim 1 wherein the nonselected command node is identified as being an aged command because of an interval that it has resided in the volatile memory without the command prioritizing logic having selected it for the scheduling.

3. The apparatus of claim 1 wherein the command prioritizing logic is characterized by the plurality of command nodes being those that are each individually executable within a predefined interval.

4. The apparatus of claim 3 wherein the command prioritizing logic is characterized by selecting two or more of the command nodes that together are executable within the predefined interval.

5. The apparatus of claim 1 wherein the command prioritizing logic is characterized by the plurality of command nodes being those that are associated with a predefined zone of the main storage space.

6. The apparatus of claim 1 wherein the plurality of command nodes stored in the volatile buffer includes pending command nodes and nonpending command nodes, and wherein the command prioritizing logic is characterized by selecting a command node at least partially on a basis that it is a pending command node.

7. The apparatus of claim 6 wherein the command prioritizing logic is characterized by only transferring nonpending command nodes to the nonvolatile buffer.

8. The apparatus of claim 3 wherein the nonvolatile buffer stores a plurality of previously transferred nonselected command nodes, and wherein the command prioritizing logic is further configured for identifying one of the nonselected command nodes of the plurality in the nonvolatile buffer to be a nonpenalizing command node because it is executable along with executing the selected command node within the predetermined interval.

9. The apparatus of claim 3 wherein the command prioritizing logic is further configured for referencing the selected command node in a first command queue that also references a plurality of previously selected command nodes, and further configured for identifying the transferred nonselected command node to be a nonpenalizing command node with respect to one of the selected command nodes in the first command queue because the nonpenalizing command node is executable along with one of the selected command nodes in the first command queue within the predetermined interval.

10. The apparatus of claim 9 wherein the command prioritizing logic is further configured for referencing the nonpenalizing command node residing in the nonvolatile memory in a second command queue different than the first command queue, and for executing the selected command node and the nonpenalizing command node by simultaneously executing command nodes from the first and second queues.

* * * * *